US007143981B2

(12) United States Patent
Strauss et al.

(10) Patent No.: US 7,143,981 B2
(45) Date of Patent: Dec. 5, 2006

(54) PARACHUTE RESCUE SYSTEM FOR MULTISTORY BUILDINGS

(76) Inventors: Otto Strauss, Joseph-Schmidt-WEG 5, 59759 Arnsberg (DE); Peter Trautes, Lohstr, 12, 58802 Balve (DE)

( * ) Notice: Subject to any disclaimer, the term of this patent is extended or adjusted under 35 U.S.C. 154(b) by 183 days.

(21) Appl. No.: 10/494,519

(22) PCT Filed: Nov. 13, 2002

(86) PCT No.: PCT/EP02/12684

§ 371 (c)(1),
(2), (4) Date: May 14, 2004

(87) PCT Pub. No.: WO03/041798

PCT Pub. Date: May 22, 2003

(65) Prior Publication Data

US 2005/0006530 A1 Jan. 13, 2005

(30) Foreign Application Priority Data

Nov. 15, 2001 (DE) ................................ 101 56 018

(51) Int. Cl.
*B64D 25/00* (2006.01)

(52) U.S. Cl. ........................................................ 244/141

(58) Field of Classification Search ................ 244/149, 244/138 R, 142, 141, 150; 182/36, 37, 38, 182/142

See application file for complete search history.

(56) References Cited

U.S. PATENT DOCUMENTS

| | | | | |
|---|---|---|---|---|
| 1,021,336 | A * | 3/1912 | Fonoll | 182/37 |
| 2,389,160 | A | 11/1945 | Manson et al. | |
| 2,390,230 | A * | 12/1945 | Trusty | 244/141 |
| 2,806,667 | A * | 9/1957 | Kugler | 244/141 |
| 2,844,187 | A * | 7/1958 | Scoville | 104/93 |
| 3,120,365 | A * | 2/1964 | Gutacker | 244/149 |
| 3,813,066 | A * | 5/1974 | Raznov | 244/150 |
| 4,105,173 | A | 8/1978 | Bucker | |
| 4,396,094 | A * | 8/1983 | Charlton et al. | 187/245 |
| 4,520,899 | A | 6/1985 | Vasquez | |
| 5,826,678 | A | 10/1998 | Yu | |
| 5,979,829 | A * | 11/1999 | Nance et al. | 244/141 |

* cited by examiner

*Primary Examiner*—Tien Dinh

(74) *Attorney, Agent, or Firm*—Hoffman, Wasson & Gitler, PC

(57) ABSTRACT

The present invention relates to a parachute rescue system which is intended for rescuing people from danger zones and comprises a parachute and a seat. The seat can be maneuvered outwards into the open air from a multistory building by means of a guiding device through an opening in the walls of the building.

16 Claims, 2 Drawing Sheets

PARACHUTE RESCUE SYSTEM FOR MULTISTORY BUILDINGS

BACKGROUND OF THE INVENTION

The present invention relates to a parachute rescue system which is intended for rescuing people from danger zones and comprises a parachute and a seat.

The present invention is based on the fact that there are danger zones from which, when danger arises, people can only be freed by means of parachute rescue systems.

Aircraft constitute particular zones in which people are exposed to certain dangers. The danger encountered in an aircraft, for example the failure of engines or the break-out of fires, cannot be overcome by external assistance, with the result that the members of aircraft crews have to initiate dedicated rescue measures.

The existing art provides ejector seats for such times of danger. Ejector seats are seats for members of an aircraft crew which are equipped, and constructed, such that, in the event of emergency, they can be catapulted, along with the seat occupant, out of the aircraft. The ejector seat is intended to allow the member of the crew to leave the aircraft safely. It has to be ensured that the operations of separating the member of the crew from the seat and of subsequently opening the parachute are fully automated. Pyrotechnical devices are used for actuating the various arrangements in the seat.

Junkers in Kulmbach provides a rescue system specifically for ultralight aircraft. Junkers has developed a parachute rescue system which can be integrated in an ultralight aircraft. It is thus possible for an ultralight aircraft which is in trouble to achieve a lower speed of descent by means of an opening parachute. The art thus demonstrates that efficient parachute rescue systems for aircraft crews do exist.

The dreadful terrorist attack on the World Trade Center on Sep. 11, 2001 in New York, however, has shown that multistory buildings also constitute danger zones which, when danger arises, are cut off from the outside world.

Parachute jumps for rescuing people from disaster zones, such as multistory buildings which are threatening to collapse, provide only limited prospects of success since the particularly anxious and elderly are afraid of jumping into the open. A further risk stems from the fact that it is usually difficult, when jumping from a multistory building, to move away far enough from the building, with the result that the person can be forced against the building, for example, by a gust of wind. This is where the present invention comes in.

An object of the invention is to provide a parachute rescue system which frees people from multistory buildings, the intention being for the rescue operation to be anxiety-free.

SUMMARY OF THE INVENTION

The invention is based on the idea that, by means of a guiding arrangement, a seat can be maneuvered out of a multistory building into the open, through an opening located in building walls, in an accelerated state. The fact that the person who is to be rescued is seated during the rescue operation affords him/her a feeling of safety. This is also aided by the fact that the guiding arrangement maneuvers the seat into the open in an accelerated state, and abrupt acceleration to which, for example, an ejector seat is subjected is thus ruled out. The guiding arrangement used may be a rail in which the seat can be suspended and on which the seat can be accelerated. Rails are expedient in this context since they are suitable for parts which are to be moved by rolling and sliding and can thus be accelerated via the rail.

The rescue from a multistory building ends, once the person who is to be rescued has reached the open, on the ground. In order to ensure a gentle landing, the seat is preferably provided with a damping arrangement which damps impact on the ground. In order that the person who is to be rescued is held firmly during the rescue, the seat is equipped with safety belts.

The main aim of the invention is to afford the person who is to be rescued a feeling of safety during the rescue operation. For this reason, the seat is preferably additionally provided with armrests. The seat has to be immediately available in the event of danger. Consequently, when not in use, the seat can be accommodated in a room of a multistory building, it being possible, for the purpose of rescuing a number of people, for a number of identical seats to be stowed in a space-saving manner in a room of a multistory building. The seats should thus be designed to allow them to be stacked one upon the other. Since the seat can be suspended in the rail, the rail is connected, in the room, to the ceiling by means of mounts. This straightforward design ensures forward movement of the seat. Since the seat has to be accelerated, the rail and ceiling preferably form an angle. The rail thus has, in the forward direction, a longitudinal inclination which ensures the acceleration of the seat.

Since multistory buildings are glazed, the rail ends, in the first instance, in the room. In times of danger, however, it has to be possible for the rail to extend into the open. Consequently, the present invention provides that preferably a pull-out extension rail is integrated in the rail and, if required, following a pulling-out operation, extends into the open through a non-glazed opening. The operation of suspending the seat, of course, presupposes that it is possible to produce a connection between the seat and rail. An accelerated movement of the seat into the open also implies that the seat can execute an accelerated movement on the extension rail. The parachute rescue system according to the invention thus ensures that the seat can be coupled into an extended rail structure by means of an accommodating arrangement and of a suspension gear mechanism, and can move forward both on the rail and on an extension rail. Of course, the rescue has to proceed quickly, that is to say the seat has to be capable of leaving the building as quickly as possible. The ceiling and the rail thus preferably form such an angle as to bring about the highest possible acceleration of the seat. The rescue operation through the opening located in the building wall presupposes that the seat can also pass through the opening, that is to say that the seat has dimensions which allow it to pass through an opening of a room in a multistory building. The glazing has to be removed here. An opening can be transformed into a non-glazed state by explosion. The seat can be moved by rolling on the rails. Rolling movements on rails, however, also involve frictional losses, as a result of which accelerations can be reduced. Rolling arrangements which leave behind the lowest possible frictional losses on a rail structure and an extension rail are thus provided for the parachute rescue system.

The second part of the rescue operation starts as the seat leaves the multistory building. A safe trajectory is achieved if the seat is spaced apart by a suitable distance from the building wall. In other words, the seat has to leave the building at as high a speed as possible in order thus, in accordance with the laws of dynamics, to travel through a parabolic trajectory. The endpiece of the extension rail thus has to be designed such that the seat leaves the extension rail rectilinearly.

The parachute rescue system thus provides that the endpiece of the extension rail has a rail profile which ensures a parabolic trajectory of a free-falling seat.

The parachute of the parachute rescue system is opened shortly after it leaves the multistory building. The opening operation takes place automatically, that is to say the parachute can be set in operation by means of a light barrier installed at the opening, but also by means of a manual arrangement. The, for example, pyrotechnical opening of the parachute preferably takes place at a fixed point in time after it has left the building or, for example, via a difference-in-altitude meter (based on air pressure) which, following a certain falling height, depending on the launch height, causes the parachute to open.

BRIEF DESCRIPTION OF THE DRAWINGS

Further features and advantages of the present invention become clear from the following description of preferred exemplary embodiments, with reference to the attached drawings, in which.

Figure 1:
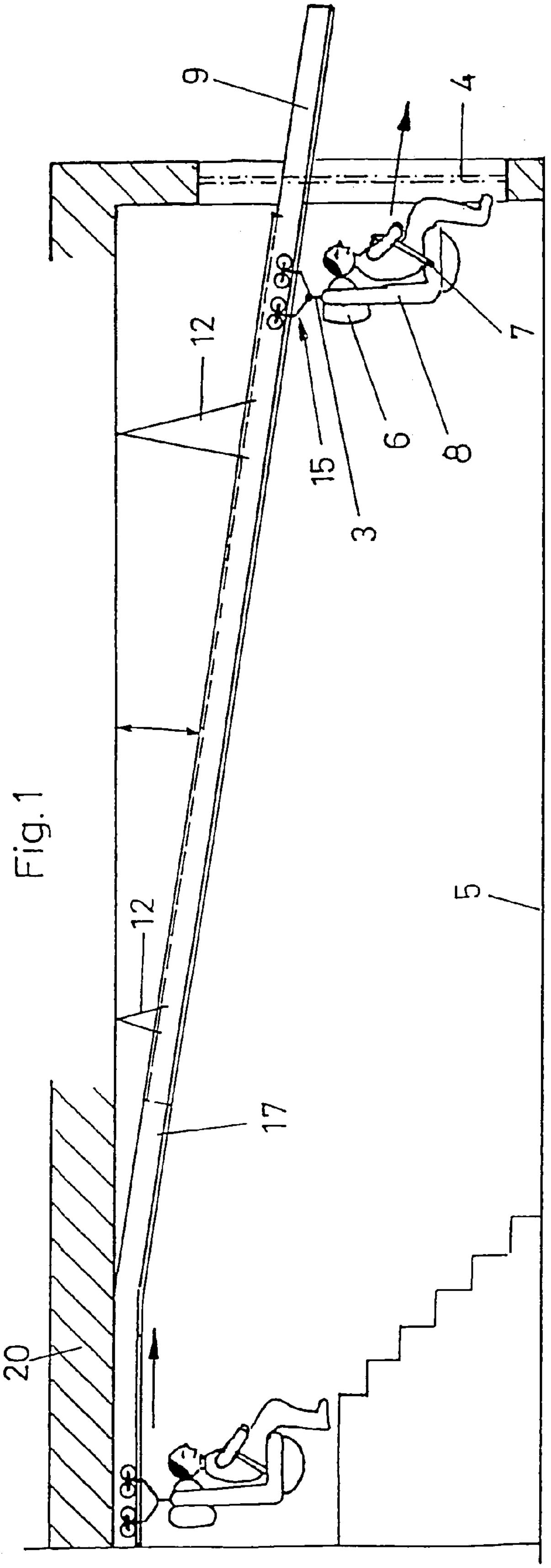
FIG. 1 shows a schematically simplified illustration for the purpose of explaining an exemplary arrangement according to the invention for rescuing people from buildings.

Reference will be made first of all to FIG. 1. The illustration shows a possible exemplary arrangement which is contained in a room 5 of a building and by means of which people can be rescued from buildings. The arrangement comprises a small number of individual components overall, this making it a straightforward arrangement which can be transported and installed without high outlay. As can be seen from FIG. 1, the arrangement comprises a rail structure 17 which is suspended by means of mounts 12 and forms an angle with the ceiling 20, with the result that the rail 17 is inclined in the longitudinal direction. The mounts 12 are fastened on the ceiling 20 and on the rail structure 17 in such a manner that the rail structure 17 is held firmly, it being possible for the rail structure 17 to be removed again, possibly for use in other rooms. The mounts 12 are designed for large loads and have corresponding fastening means 11. The rail structure 17 serves as a guiding arrangement for the suspension gear mechanism 15, which can be coupled into the rail structure 17 and can thus move forward on the rail structure 17. Furthermore, an extension rail 9 is integrated in the rail structure 17 such that the extension rail can be moved with sliding action into or out of the rail structure 17. The extendable rail structure 17 is located predominantly in buildings which are glazed but do not have any windows for opening. Escape from a room 5 in times of danger thus presupposes that the glazing can be breached by being exploded. In the case of an opening 4 which has had its glazing removed by explosion, it is thus possible for the rail structure 17 to be extended through the opening 4 with the aid of the extension rail 9, with the result that the extended rail structure 17 extends some way into the open. The mount 12 can be fastened at any desired locations of the ceiling 20, with the result that the rail structure 17 extended by the extension rail 9 can pass through the opening 4 basically at any desired location. The parachute rescue system 6 according to the invention is fastened on the suspension gear mechanism 15 by way of the parachute seat 8, on which the person who is to be rescued sits. Moreover, the parachute seat 8 is also provided with an impact-damping arrangement 7, which is located beneath the seat 8. The connection between the parachute seat 8 and the suspension gear mechanism 15 here is produced by a specific accommodating arrangement 3. In the horizontal section of the rail structure 17, the parachute seat 8 is in a rest state, with the result that the user of the parachute seat 8 gains easy access to the seat 8 via a step-like construction placed directly beneath the horizontal section. If, in contrast, the parachute seat 8 is located along the longitudinal inclination of the rail structure 17, and thus in a state of acceleration, it is necessary, in order to gain access to the seat 8, for the seat 8 to be temporarily held in a rest state by hand. The parachute seat 8 has to have dimensions which allow it to pass through the opening 4 in a room 5 of a building 1. Furthermore, the operation of rescuing a number of people from the room requires as many parachute seats 8 as possible to be available. Accordingly, the parachute seats 8 are designed to allow them to be stacked one upon the other. It is then possible, in times of danger, for a person to use the parachute seat 8 and to pass out of the room 5 into the open, through the opening 4 in an accelerated state. However, the psychological advantage which the people who are to be rescued draw from being seated in the parachute seat 8 is only maintained if the parachute seat 8 passes as quickly as possible through the opening 4 and into the open.

Figure 2:
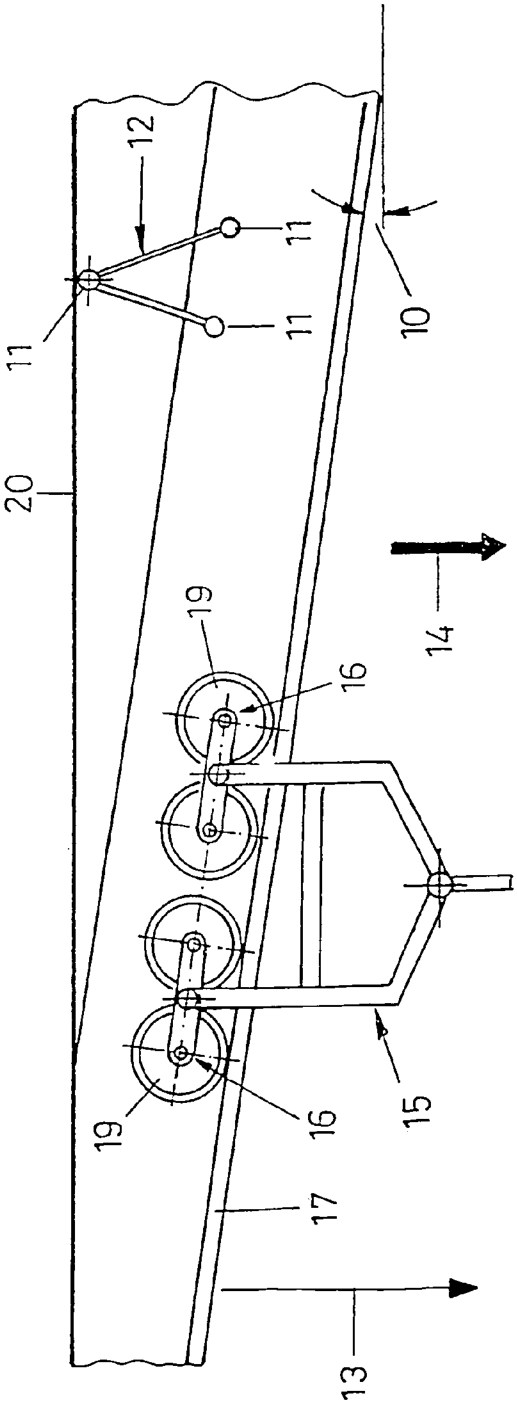
FIG. 2 shows a view of an exemplary rolling arrangement of the arrangement according to the invention.

FIG. 2 thus provides a more precise view of the dynamics of the rolling movement on the extended rail structure 17. The rail structure 17 serves as a guiding arrangement for the suspension gear mechanism 15, which can be moved by rollers 19. The rollers can be fitted, for example, into a crosspiece. An angle 10 produces a difference in height between the two end points of the extended rail structure 17. This difference in height is indicated by an arrow 13. The parachute seat 8 requires a high level of acceleration in order to leave the danger zone quickly. The acceleration of the parachute seat 8 is determined by the magnitude of the angle 10 and the weight of the load to which the suspension gear mechanism 15 is subjected. The weight of the load is oriented in the direction of the arrow 14. An initial acceleration of the parachute seat 8 which is in the rest state can also be brought about by external action, for example by impact or by pushing. For the purpose of higher acceleration, the rolling movement has to leave behind the lowest possible frictional losses. For this reason, it is expedient for the rollers 19 to be equipped with a ball bearing 16.

Figure 3:
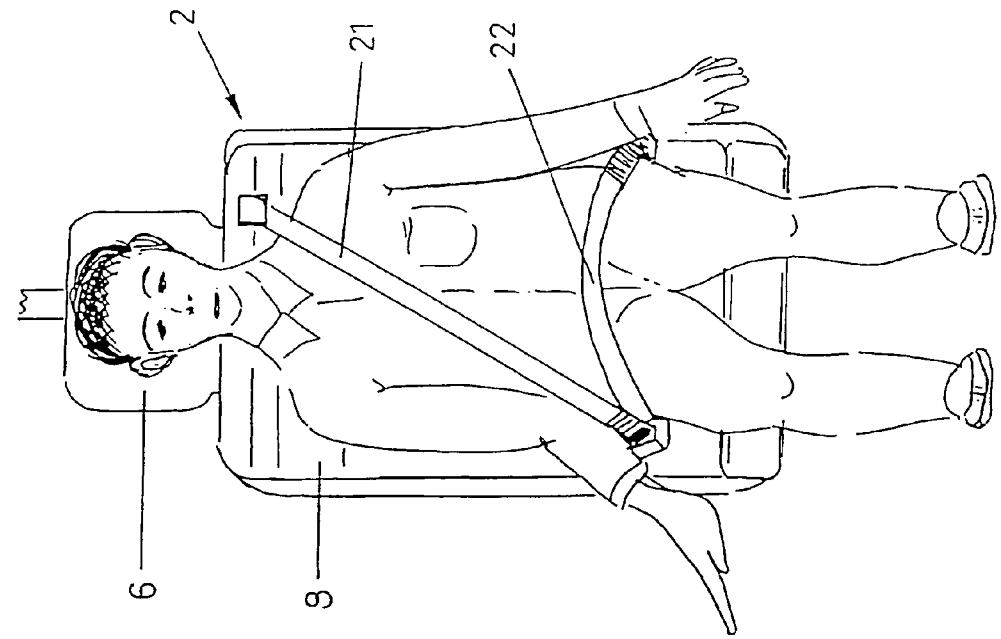
FIG. 3 shows a perspective front view of an exemplary parachute seat of the arrangement according to the invention.

Since the person who is to be rescued is seated during the rescue operation, FIG. 3 shows the front view of a parachute seat 8. The parachute seat 8 can comprise both a shoulder belt 21 and a lap belt 22. The shoulder belt 21 extends, for example, from a top belt retractor to an insertion lug, which can be inserted by the user in a known manner into a corresponding belt-anchoring means. The parachute seat 8 may also have pivotable side supports, which afford the user of the parachute seat 8 an additional feeling of safety during acceleration on the rail and during movement in the open. Once the parachute seat leaves the opening 4, the second part of the rescue operation commences, this consisting in that the parachute rescue system 6 performs its function as the parachute seat 8 is in the process of free-falling.

Figure 4:
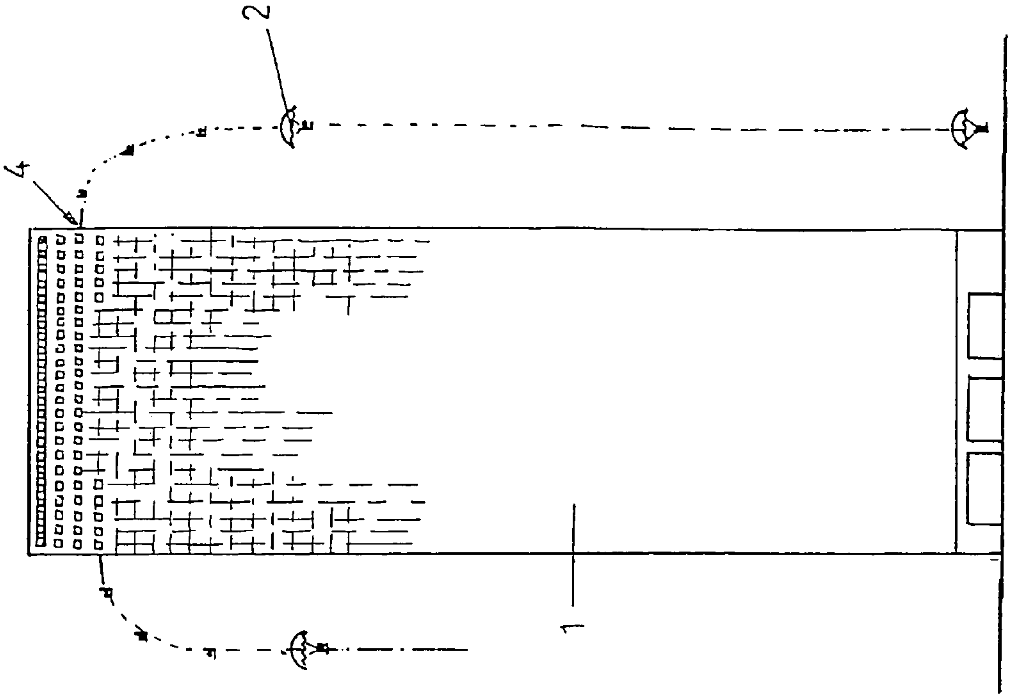
FIG. 4 shows a view of a parabolic falling movement from a multistory building.

This falling movement is shown in FIG. 4. The rescue takes place from a room 5 which is equipped with an opening 4 and is located in a top story of a multistory building 1. In accordance with the laws of free-fall dynamics, the parachute seat 8 travels through a parabolic trajectory 2 as it leaves the opening 4 rectilinearly, that is to say in a horizontal direction, at the speed v. The parachute seat 8 should have the highest possible speed v when it leaves the window opening 4, with the result that the parachute seat leaving the building ends up spaced apart by a suitable distance from the building wall. The parachute rescue system 6 can be alternated by a timer, it being possible for the timer to be set in operation by means of a light barrier, installed at the window opening 4, as the parachute seat passes through the exploded glazed opening 4, that is to say, while the parachute seat 8 is in the process of free-falling, the parachute rescue system 6 performs its function by opening the parachute after a certain period of time. It is also possible, however, for the parachute to be opened by a manual arrangement. The parachute rescue system 6 comprises, in a manner known per se, the component which supplies the air resistance, in other words the canopy, which is connected to the parachute seat 8 by means of rigging lines and ensures a reduction in the speed of descent of the parachute seat 8 as it falls. The damping arrangement integrated in the parachute seat 8, furthermore, ensures that the user of the parachute seat 8 experiences a gentle landing upon impact with the ground and that the rescue thus reaches a successful conclusion.

DESIGNATIONS

1 Multistory building
2 Parabolic trajectory
3 Accommodating arrangement
4 Opening
5 Room
6 Parachute rescue system
7 Damping arrangement
8 Seat
9 Extension rail
10 Angle
11 Fastening means
12 Mounts
13, 14 Arrow
15 Suspension gear mechanism
16 Ball bearing
17 Rail structure
18 Axis
19 Running rollers
20 Ceiling
21 Shoulder belt
22 Lap belt

What is claimed is:

1. A parachute rescue system comprising a parachute and a seat, wherein by means of a guiding arrangement, the seat can be maneuvered out of a multistory building into the open, through an opening located in the building walls, in an accelerated state, wherein a room contains a rail structure which is connected to a ceiling by means of mounts and forms an angle with a ceiling.

2. The parachute rescue system as claimed in claim 1, wherein the guiding arrangement used is a rail in which a seat can be suspended and on which a seat can be accelerated.

3. A parachute rescue system comprising a parachute and a seat, wherein by means of a guiding arrangement, the seat can be maneuvered out of a multistory building into the open, through an opening located in the building walls, in an accelerated state wherein the seat is provided with an impact-damping arrangement.

4. The parachute rescue system as claimed in claim 1, wherein the seat is equipped with safety belts or armrests.

5. The parachute rescue system as claim 1, wherein when not in use, the seat can be accommodated in a room of the multistory building.

6. The parachute rescue system as claimed claim 1, wherein a number of identical seats can be stowed in a space-saving manner in a room of the multistory building.

7. A parachute rescue system comprising a parachute and a seat, wherein by means of a guiding arrangement, the seat can be maneuvered out of a multistory building into the open, through an opening located in the building walls, in an accelerated state, wherein a pull-out extension rail is integrated in a rail structure and, following a pulling-out operation, extends into the open through a non-glazed opening.

8. The parachute rescue system as claimed in claim 1, wherein the seat can be coupled into an extended rail structure by means of an accommodating arrangement and of a suspension gear mechanism, and can move forward both on a rail (17) and on an extension rail.

9. A parachute rescue system comprising a parachute and a seat, wherein by means of a guiding arrangement, the seat can be maneuvered out of a multistory building into the open, through an opening located in the building walls, in an accelerated state, wherein a ceiling and a rail form such an angle as to bring about the highest possible acceleration of a seat.

10. The parachute rescue system as claimed in claim 1, wherein the seat has dimensions which allow it to pass through an opening of a room in a multistory building.

11. The parachute rescue system as claimed in claim 10, wherein the opening can be transformed into a non-glazed state by explosion.

12. The parachute rescue system as claimed in claim 1 further comprises a rolling arrangement that leaves behind the lowest possible frictional losses on a rail structure and an extension rail.

13. A parachute rescue system comprising a parachute and a seat, wherein by means of a guiding arrangement, the seat can be maneuvered out of a multistory building into the open, through an opening located in the building walls, in an accelerated state, a rolling arrangement that leaves behind the lowest possible frictional losses on a rail structure and an extension rail, wherein an endpiece of the extension rail has a rail profile which ensures a parabolic trajectory of a free-falling seat.

14. The parachute rescue system as claimed in claim 1, wherein parachute is opened shortly after it leaves a multistory building, once a seat has been maneuvered onto a parabolic trajectory.

15. The parachute rescue system as claimed in claim 1, wherein the parachute is opened via a timer or a difference-in-altitude meter, which is set in operation by means of a light barrier installed in the opening.

16. The parachute rescue system as claimed in claim 1, wherein the parachute is opened by means of a manual arrangement.

* * * * *